US010431966B2

(12) United States Patent
Chen et al.

(10) Patent No.: US 10,431,966 B2
(45) Date of Patent: Oct. 1, 2019

(54) HEAVY-CURRENT SYSTEM AND HEAVY-CURRENT DISTRIBUTOR USED IN BUILDING

(71) Applicants: Dongguan Vanke Building Technique Research Co., Ltd, Dongguan, Guangdong (CN); Dongguan Solar Optronics Co., Ltd, Dongguan, Guangdong (CN)

(72) Inventors: Qubo Chen, Guangdong (CN); Enbo Dong, Guangdong (CN); Yechang Zhou, Guangdong (CN); Yun Wang, Guangdong (CN); Jiangmin Huang, Guangdong (CN); Chaobin Zhou, Guangdong (CN); Bowen Hu, Guangdong (CN)

(73) Assignees: Dongguan Vanke Building Technique Research Co., Ltd, Dongguan (CN); Dongguan Solar Optronics Co., Ltd, Dongguan (CN)

( * ) Notice: Subject to any disclaimer, the term of this patent is extended or adjusted under 35 U.S.C. 154(b) by 170 days.

(21) Appl. No.: 14/973,782

(22) Filed: Dec. 18, 2015

(65) Prior Publication Data

US 2016/0226227 A1   Aug. 4, 2016

(30) Foreign Application Priority Data

Jan. 30, 2015   (CN) .......................... 2015 1 0050809
Jan. 30, 2015   (CN) .......................... 2015 1 0052140

(51) Int. Cl.
*H02B 1/26*   (2006.01)
*H02G 3/00*   (2006.01)
(Continued)

(52) U.S. Cl.
CPC ............. *H02G 3/00* (2013.01); *H01R 4/4836* (2013.01); *H01R 12/515* (2013.01)

(58) Field of Classification Search
None
See application file for complete search history.

(56) References Cited

U.S. PATENT DOCUMENTS 4,462,066 A * 7/1984 Gibson .................... A63H 3/52
                                                        174/DIG. 8
5,268,850 A * 12/1993 Skoglund .................. H02J 9/08
                                                        307/43

(Continued)

*Primary Examiner* — Courtney L Smith

(57) ABSTRACT

A heavy-current system, and a heavy-current distributor used in a building are provided; the heavy-current system comprises a plurality of first distributors respectively installed in different positions, and a plurality of electric equipments; each of the first distributors includes a PCB board, a power transmission copper bar, an inlet port, and a plurality of groups of connection ports; wherein the power transmission copper bar, the inlet port and the connection ports are arranged on the PCB board; the inlet port and the connection ports are further electrically connected to each other via the power transmission copper bar; the inlet port of the first distributor is connected to the distribution box via power transmission line, and the electric equipments are respectively connected to the inlet port of one of the first distributors via the power transmission lines.

9 Claims, 3 Drawing Sheets

(51) Int. Cl.
   *H01R 4/48*   (2006.01)
   *H01R 12/51*  (2011.01)

(56) References Cited

U.S. PATENT DOCUMENTS

| | | | |
|---|---|---|---|
| 9,281,716 B2* | 3/2016 | Albsmeier | H02J 9/06 |
| 9,841,799 B2* | 12/2017 | Mauk | G06F 1/266 |
| 2006/0018069 A1* | 1/2006 | Gull | H02J 3/005 |
| | | | 361/90 |
| 2011/0175450 A1* | 7/2011 | Vicari | G05B 15/02 |
| | | | 307/62 |
| 2015/0280410 A1* | 10/2015 | Elberbaum | H02G 3/18 |
| | | | 361/679.01 |
| 2016/0336722 A1* | 11/2016 | Taxter | H02B 1/28 |

* cited by examiner

HEAVY-CURRENT SYSTEM AND HEAVY-CURRENT DISTRIBUTOR USED IN BUILDING

CROSS-REFERENCE TO RELATED APPLICATIONS

The present application claims the benefit of Chinese Patent Application No. 201510050809.X filed on Jan. 30, 2015 and Chinese Patent Application No. 201510052140.8 filed on Jan. 30, 2015, the contents of which are hereby incorporated by reference.

TECHNICAL FIELD

The present application relates to a power transmission and distribution technology, and more particularly, relates to a heavy-current system and a heavy-current distributor used in a building.

BACKGROUND

Electrical wiring is a base engineering in a home decoration. Generally, in order to make the wiring safe and beautiful, in a conventional wiring mode, open slots are defined on a wall, and then cables are buried in the open slots.

During the wiring process, firstly, open slots are defined on the floor or the wall, then cable conduits are buried in the open slots defined on the floor or the wall, and finally cement mortar is filled into the open slots. The cables run through the cable conduits, of the convenience of the replacement of the cables in future. However, in the wiring mode described above, it has to define open slots on the floor or the wall constructed by reinforced concrete, which is time-consuming; besides, the wall structure is prone to be damaged.

Furthermore, in an existing indoor wiring mode, a distribution box is disposed below a household electricity meter. All of the cables are led out from the distribution box, and thus the wiring is messy. In this case, when there is a fault in one of the lines, all of the lines indoor need to be powered off, and all of the cables throughout the room need to be checked during the maintenance.

In addition, during the installation of lighting devices, the cables are generally connected to each other, and insulation rubbers are wrapped on the connection position; in this way, the wiring is achieved. During the installation of the lighting devices, it is also possible for the cables to be fixed using screws. However, the wiring modes described above are tedious, and have a low efficiency.

BRIEF SUMMARY

The object of the present application is to provide a heavy-current system and a heavy-current distributor used in a building, which is standardized, convenient, and capable of being quickly constructed, aiming at the defects in the art that the layout of the indoor heavy-current power transmission lines is messy, and the installation and the maintenance are tedious.

The technical solutions to solve the technical problem are as follows.

In one aspect, a heavy-current system used in a building is provided, which comprises a distribution box, wherein the heavy-current system further includes a plurality of first distributors respectively installed in different positions, and a plurality of electric equipments; each of the first distributors includes a PCB board, a power transmission copper bar, an inlet port, and a plurality of groups of connection ports; wherein the power transmission copper bar, the inlet port and the connection ports are arranged on the PCB board; the inlet port and each group of connection ports are further electrically connected to each other via the power transmission copper bar; the inlet port of the first distributor is connected to the distribution box via power transmission line, and the electric equipments are respectively connected to the inlet port of one of the first distributors via the power transmission lines; the power transmission copper bar includes a live line copper bar and a neutral line copper bar; the live line copper bar and the neutral line copper bar are formed by copper foils printed on the PCB board, and the copper coils each have a thickness of 50-100 µm; a fuse is arranged on the live line copper bar; the electric equipments includes lighting devices and corresponding switches; wherein each group of the connection ports includes one lighting device port and at least one switch port; the lighting device port and the switch ports of the connection ports in the same group are connected in series between the live line copper bar and the neutral line copper bar; the first distributor is installed in a cavity of a suspended ceiling, a partition, or a cabinet; the power transmission lines led out from the first distributor go through the cavity of a suspended ceiling, a partition, and/or a cabinet and electronically connect to the electric equipments; quick-connect terminals are arranged on the lighting device ports and the switch ports; ends of the power transmission lines respectively connected to the lighting devices and the corresponding switches are electrically connected to the lighting device port and the switch port of the PCB board via the quick-connect terminals; the quick-connect terminal includes three-point conducting strips and a wire removing handle; when the wire removing handle is pressed down, the three-point conducting strips are loosened; when the wire removing handle is released, the three-point conducting strips clamp the power transmission lines.

In another aspect, a heavy-current distributor used in a building is further provided, which comprises a PCB board, a power transmission copper bar, an inlet port, and a plurality of groups of connection ports; wherein the inlet port and the plurality of connection ports are arranged on the PCB board; the power transmission copper bar includes a live line copper bar and a neutral line copper bar, and the live line copper bar and the neutral line copper bar are separated from each other via insulation materials or a substrate of the PCB board; the inlet port is configured to connect to an external input power, while the connection ports are configured to connect to electric equipments; the inlet port and each group of connection ports are electrically connected to the live line copper bar and the neutral line copper bar respectively; the live line copper bar and the neutral line copper bar are formed by copper foils printed on the PCB board, and the copper coils each have a thickness of 50-100 µm; a fuse is arranged on the live line copper bar.

In a further aspect, a construction method for the heavy-current system used in a building is further provided, which comprises the following steps:

(a) determining installation positions of all the electric equipments and the quantity and installation positions of first distributors, based on a dwelling unit type of the building;

(b) customizing and producing the first distributors and the power transmission lines based on the installation positions of all the electric equipments and the quantity and the installation positions of the first distributors; each of the first distributors includes a PCB board, a power transmission copper bar, an inlet port, and a plurality of groups of connection ports; wherein the power transmission copper bar, the inlet port, and the plurality of groups of connection ports are arranged on the PCB board; the inlet port and each group of connection ports are electrically connected to each other via a power transmission copper bar;

(c) directly or indirectly connecting the inlet ports of the first distributors to the distribution box via the power transmission lines, and connecting the electric equipments to the connection ports of one of the first distributors via the power transmission lines.

In the heavy-current system and the heavy-current distributor used in a building according to the present application, the electric equipments (such as lighting devices) in a plurality of different regions are supplied with power via the plurality of first distributors respectively; in this way, the indoor wiring is simplified, the maintainability of the power transmission lines is improved, and the problem that power transmission lines are directly led out from the distribution box can be avoided. Furthermore, the routing of the power transmission lines is accomplished via the cavity of a suspended ceiling, a cabinet, or a partition, without needing to define open slots and further bury cable conduits on the floor, and thus the wiring efficiency is further improved. Moreover, a quick-connect terminal is used to achieve the connection to the power transmission lines in the present application, and thus the wiring of the power transmission lines is facilitated.

DETAILED DESCRIPTION OF THE PREFERRED EMBODIMENT

Figure 1:
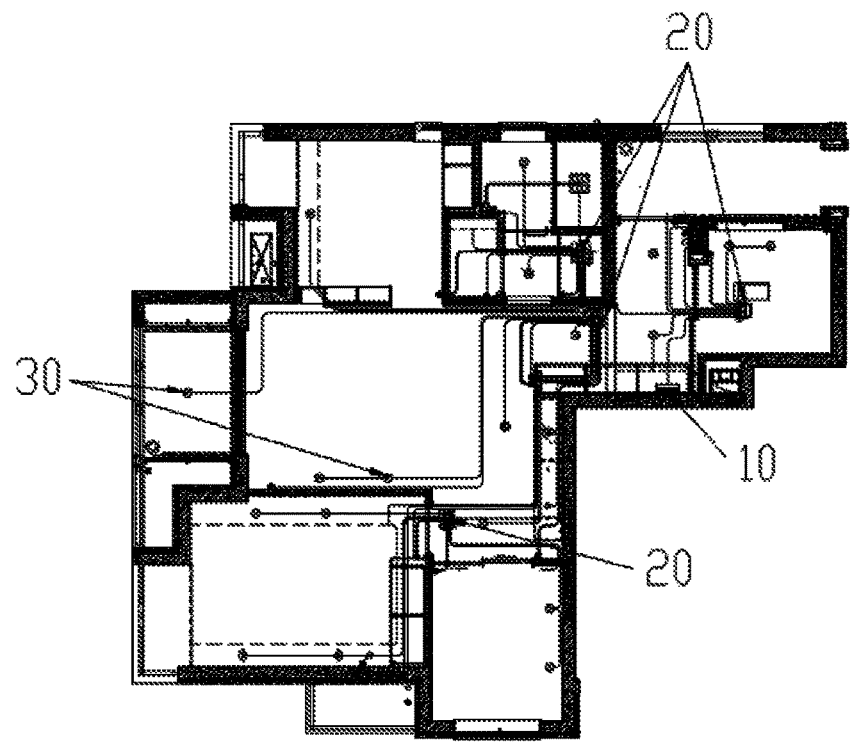
FIG. 1 is a schematic view of a heavy-current system used in a building according to an embodiment of the present application.
Figure 2:
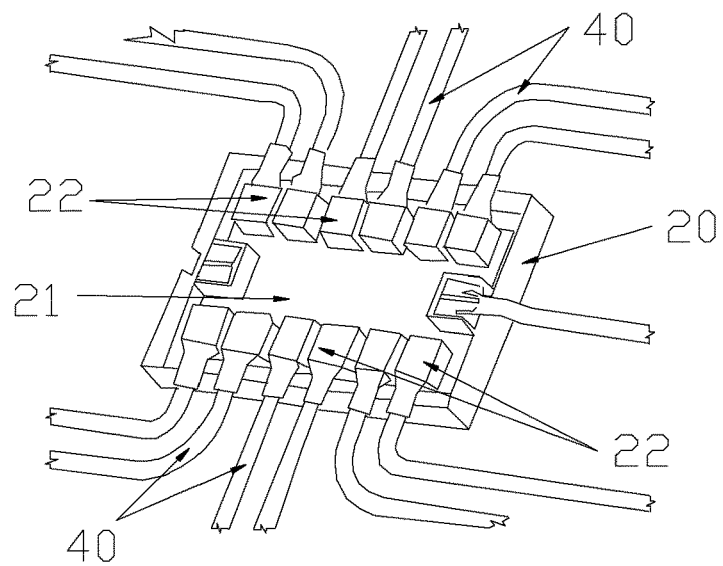
FIG. 2 is a schematic view of the first distributor shown in FIG. 1, wherein the first distributor is connected to power transmission lines.
Figure 3:
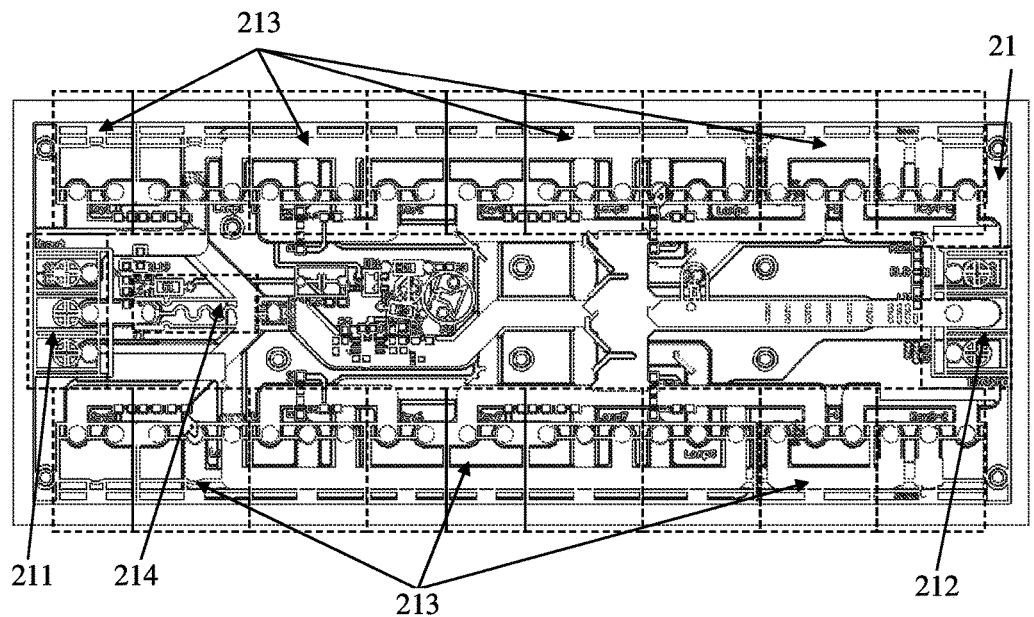
FIG. 3 is a schematic view of the PCB board shown in FIG. 2.

To make the object, the technical solution and the technical advantages more clearly, the present application will be further described with reference to the accompanying drawings and embodiments in the following. It should be understood that, the specific embodiment described here is just for explanation, not for limitation.

FIGS. 1-5 show a heavy-current system used in a building according to an embodiment of the present application, which is used to achieve a heavy-current power transmission in the building. In this embodiment, a power transmission system includes a distribution box 10, a first distributor 20, a plurality of lighting devices 30, and a plurality of switches corresponding to the lighting devices 30. It is possible for the distribution box 10 described above to be connected to an electricity meter (i.e., a household electricity meter). A plurality of first distributors 20 are respectively installed in different positions in the building (for example, the living room, each of the bedrooms, the kitchen, and the washing room respectively have one first distributor installed therein). The plurality of first distributors 20 are directly or indirectly connected to the distribution box 10 via power transmission lines. The plurality of lighting devices 30 and the corresponding switches are respectively connected to one corresponding first distributor 20 (for example, all the lighting devices 30 installed in the living room and the corresponding switches are respectively electronically connected to the first distributor 20 installed in the living room, while all the lighting devices 30 installed in a bedroom and the corresponding switches are respectively connected to the first distributor 20 installed in that bedroom).

Certainly, in practical applications, it is also possible for the lighting devices 30 to be other types of electric equipments.

Each of the first distributors 20 described above includes a PCB board 21, a power transmission copper bar, an inlet port 211, an outlet port 212 and a plurality of groups of connection ports 213. In this case, the power transmission copper bar, the inlet port 211, the outlet port 212 and the connection ports 213 are arranged on the PCB board 21. Besides, the inlet port 211, the outlet port 212 and each group of connection ports 213 are electrically connected to each other via the power transmission copper bar. The inlet port 211 of one of the first distributors 20 is connected to the distribution box 10 or to the outlet port 212 of a further first distributor 20 via the power transmission line. The connection port 213 of the first distributor 20 is configured to connect to the lighting device 30 and the corresponding switch via the power transmission line 40, in order to achieve a power supply to the lighting device 30.

In particular, in the PCB boar 21 described above, the connection ports 213 in the same group each include one lighting device port and at least one switch port; wherein the lighting device port is configured to connect to a lighting device 30, while the switch port is configured to connect to a switch which controls the ON and OFF state of lighting device 30. The lighting device ports and the switch ports in the same group of connection ports 213 are connected in series via the power transmission lines and the power transmission copper bar.

In the heavy-current system used in a building described above, the lighting devices in a plurality of different regions are supplied with power via the plurality of first distributors 20 respectively. In this way, the power transmission lines are avoided from being directly led out from the distribution box 10 to the lighting devices, and thus the indoor wiring is simplified, the maintainability of the power transmission lines is improved, and the power transmission lines can also be saved as a result.

The power transmission copper bar on the PCB board 21 includes a live line copper bar and a neutral line copper bar (an earth line copper bar may also be included). In this case, the live line copper bar and the neutral line copper bar (the earth line copper bar) are formed by copper foils printed on the PCB board 21 (for example, the live line copper bar and the neutral line copper bar are printed on different surfaces of the PCB board 21). The copper coils each have a thickness of 50-100 μm. Furthermore, tin may be coated on the copper coils, while more copper may be added to particular positions. The wiring in the first distributor 20 may be simplified by the power transmission copper bar. In this way, compared with the conventional distribution box 10, the inner structure of the distribution box is simplified, and the operator can accomplish the wiring without needing any experience.

An over current protection device may be added into the first distributor 20, in order to provide countermeasures for the safety problems such as a short in circuit, or in the lighting device, and thus the safety of the whole system is improved. Specifically, the over current protection device may be a fuse 214 on the live line copper bar. That is, a fuse 214 is added at the inlet port 211, and is further connected to the live line copper bar in the PCB board 21. Due to the over current protection device, when one region is shorted, only the corresponding first distributor 20 stops supplying power, without influencing the power supply to the lighting devices 30 in other regions.

In order to reduce the open slots during wiring, the first distributor 20 may be installed in a cavity of a suspended ceiling, a partition, or a cabinet, or installed in other types of cavities. In addition, the power transmission lines 40 led out from the first distributor 20 are connected to the lighting devices 30 and the switches via the cavity of a suspended ceiling, a partition, a cabinet and/or other types of cavities.

For the convenience of wiring, a quick-connect terminal 22 may be arranged on the connection port 213 of the PCB board 21. The ends of the power transmission lines 40 respectively connected to the lighting device 30 and the corresponding switch are electrically connected to the connection port 213 of the PCB board 21 via the quick-connect terminal 22. The quick-connect terminal 22 has a closed structure, and live parts thereof are not exposed, and thus it is not easy to get an electric shock during construction, which ensures the safety during construction. Furthermore, the quick-connect terminal 22 includes a shell made of urea resin, and thus the quick-connect terminal 22 has excellent arc resistance and flame retardancy with regard to the abnormal heating and the flame, and thus the quick-connect terminal hardly absorbs dust with the electrostatic effect.

Figure 4:
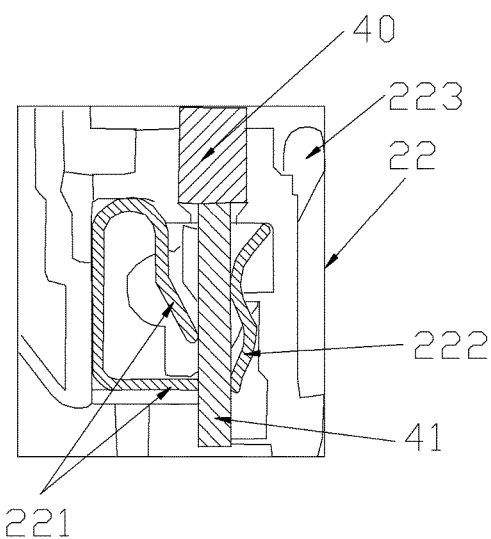
FIG. 4 is a schematic view of the quick-connect terminal shown in FIG. 2.
Figure 5:
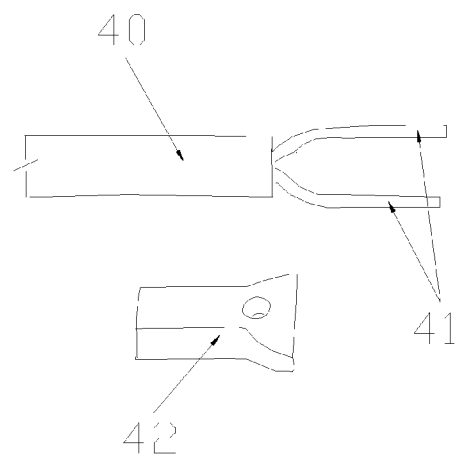
FIG. 5 is a schematic view of the wiring end of the power transmission line shown in FIG. 2.

The structure of the quick-connect terminal 22 is as shown in FIG. 4. In this case, the quick-connect terminal 22 includes three-point conducting strips 221 and 222, and a wire removing handle 223. When the wire removing handle 223 is pressed down, the three-point conducting strips 221 and 222 are loosened; however, when the wire removing handle 223 is released, the three-point conducting strips 221 and 222 clamp the copper wires 41 (i.e., the parts which have the insulating rubber peeled off) at the heads of the power transmission lines 40. In this way, during the wiring process using the quick-connect terminal 22, the wiring may be accomplished only by pressing down the wire removing handle 223, and inserting the power transmission lines 40 into the quick-connect terminal 22, and further releasing the wire removing handle 223. Therefore, compared with the wiring process using a screw terminal in the prior art, a wiring speed of the wiring process of the present application is greatly improved, the construction time is saved, the work efficiency is improved, the wiring process will not be affected by the technical levels and the moods of the constructors, and the wires is not prone to be fallen off (when the wires in the box are too long, it is possible for the wires to be distorted and deformed, a pulling stress is therefore generated, which is a main reason for the falling off of the wires). During the removing of the wires, the wire removing handle 223 is pressed down, while the power transmission lines are lifted upwardly at the same time; in this way, the wires are capable of being pulled out without tools, and the construction time is saved as a result.

In the heavy-current system used in a building, for the convenience of recognition, the ends of the power transmission lines 40 connected to different quick-connect terminals 22 respectively have rubber covers 42 in different colors and having different numbers. Besides, wiring ends of the power transmission lines 40 connected to the lighting device 30 and the corresponding switch have the rubber covers in the same colors and having the corresponding numbers. Therefore, the wiring may be accomplished only by directly connecting the power transmission lines having the corresponding colors and numbers. Therefore, the wiring process is simple, convenient and quick, and those non-professionals may also accomplish the wiring process.

An alarm circuit and a buzzer may also be arranged on the PCB board 21. In this case, the alarm circuit outputs an alarm signal to the buzzer when the first distributor 20 having the alarm circuit arranged thereon is in an abnormal working state (such as the circuit is shorted, or has a high temperature), such that the buzzer makes an alarm sound.

Figure 6:
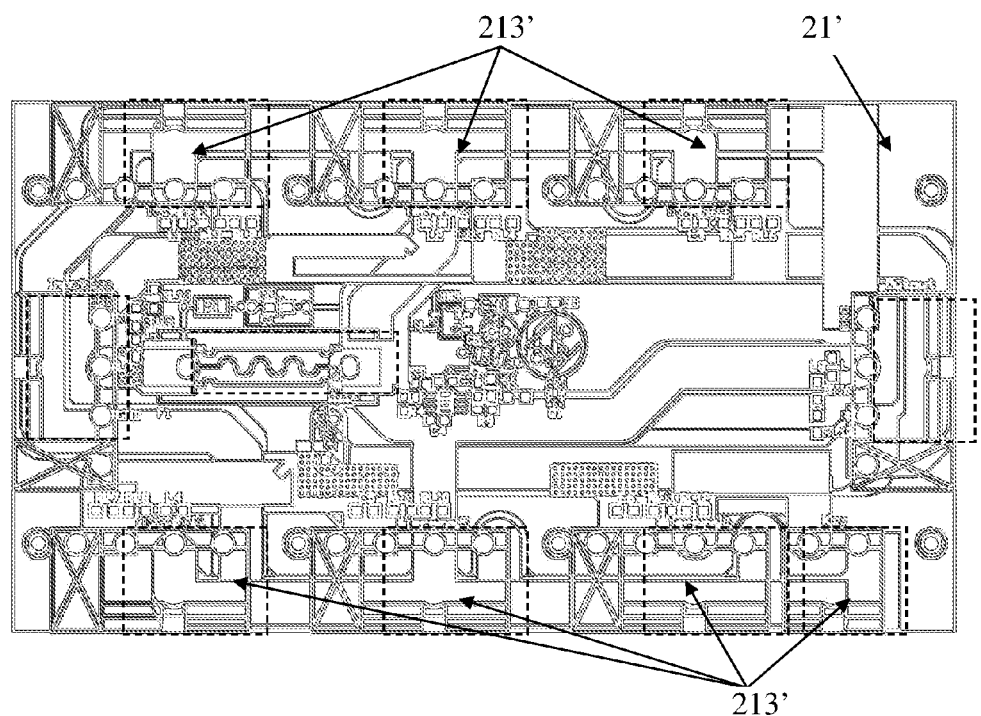
FIG. 6 is a schematic view of a PCB board of a second distributor.

As shown in FIG. 6, similarly, the heavy-current system used in a building described above further includes a plurality of second distributors installed in different positions in the building, and a plurality of sockets. Each of the second distributors includes a PCB board 21', a power transmission copper bar, an inlet port, an outlet port and a plurality of connection ports 213'. In this case, the power transmission copper bar, the inlet port, the outlet port and the connection ports 213' are arranged on the PCB board 21'. Besides, the inlet port, the outlet port and the connection ports 213' are electrically connected to each other via the power transmission copper bar. The inlet port of one of the second distributors is connected to the distribution box or to the outlet port of a further second distributor via the power transmission line. The sockets are connected to the connection ports 213' of the second distributors via the power transmission lines.

The wiring of the sockets in the building may be achieved via the second distributors. Certainly, for the wiring of high-power electric equipments (such as the sockets for air conditioners), an existing wiring mode may also be used.

The present application further provides a construction method for the heavy-current system used in a building, which comprises the following steps:

At a design stage: carrying out a systematic module design at an early stage based on the dwelling unit type of the building; that is, determining the installation positions of all the electric equipments and the quantity and the installation positions of the first distributors.

At a producing stage: carrying out an industrialized production based on the design drawings, and customizing and producing the first distributors and the power transmission lines; that is, customizing and producing the first distributors and the power transmission lines based on the installation positions of all the electric equipments and the quantity and the installation positions of the first distributors. In this case, each of the first distributors includes a PCB board, a power transmission copper bar, an inlet port, an outlet port and a plurality of groups of connection ports. In this case, the power transmission copper bar, the inlet port, the outlet port and the connection ports are arranged on the PCB board. Besides, the inlet port, the outlet port and each group of connection ports are electrically connected to each other via power transmission copper bar.

At a construction stage: directly or indirectly connecting the inlet ports of the first distributors to the distribution box via the power transmission lines; and connecting the electric equipments to the connection ports of one of the first distributors via the power transmission lines. In this step, due to the specific installation labeling system and the quick-connect terminal, the workers are helped to accomplish a quick installation of the wiring, the misoperation may be avoided from occurring, and the dependency on the technical skills of the works is reduced as a result.

The system described above uses the heavy-current and surface installation method, and is formed by using the power transmission lines protected by two layers of PVC to connect a plurality of local power networks. During the site construction, the construction may be achieved only by connecting the first distributors to the lighting devices and the switches via the quick-connect terminals, without needing to measure the length of the wires and to cut the wires, and the workers do not need to carry out the construction while considering the loop of the system. Therefore, the system is applicable to a standardized building, achieving a more quickly and accurately installation, improving the work efficiency while ensuring the uniformity of the quality.

Those are preferred embodiments of the present application. However, it should be understood that, the protection scope of the present application is not limited here. In the inspiration of the present application, one skilled in the art may easily make various modifications and equivalents, without going beyond the scope the claims intend to protect of the present application. All these belong to the protection of the present application should be protected. Therefore, the protection scope of the present application is subjected to the protection scope claimed in claims.

The invention claimed is:

1. A heavy-current system used in a building, comprising a distribution box, wherein the heavy-current system further includes a plurality of first distributors respectively installed in different positions, and a plurality of electric equipments; each first distributor includes a first PCB board, a first power transmission copper bar, a first inlet port, and a plurality of groups of first connection ports; wherein the first power transmission copper bar, the first inlet port and the plurality of groups of first connection ports are arranged on the first PCB board; the first inlet port and each group of first connection ports are further electrically connected to each other via the first power transmission copper bar; the first inlet port of each first distributor is connected to the distribution box via a first power line, and each electric equipment is respectively connected to the first inlet port of one of the plurality of first distributors via a second power line; the first power transmission copper bar includes a live line copper bar and a neutral line copper bar; the live line copper bar and the neutral line copper bar are formed by copper foils printed on the first PCB board, and the copper foils each have a thickness of 50-100 µm; a fuse is arranged on the live line copper bar; each electric equipment includes a lighting device and a switch; wherein each group of first connection ports includes one lighting device port and at least one switch port; the lighting device port and the at least one switch port of the first connection ports in a same group are connected in series between the live line copper bar and the neutral line copper bar; each first distributor is installed in a cavity of a suspended ceiling, a partition, or a cabinet; the second power line led out from each first distributor goes through the cavity of the suspended ceiling, the partition, and/or the cabinet and electronically connects to a corresponding electric equipment; the lighting device port and the at least one switch port each has a quick-connect terminal arranged thereon; an end of the second power line connected to the lighting device and the corresponding switch is electrically connected to the lighting device port and the at least one switch port of the first PCB board via the quick-connect terminal; the quick-connect terminal includes a three-point electric conducting strip and a wire removing handle; when the wire removing handle is pressed down, the three-point conducting strip is loosened; when the wire removing handle is released, the three-point conducting strip clamps the second power line.

2. A heavy-current system used in a building, comprising a distribution box, wherein the heavy-current system further comprises a plurality of first distributors respectively installed in different positions, and a plurality of electric equipments; each first distributor includes a first PCB board, a first power transmission copper bar, a first inlet port, and a plurality of groups of first connection ports; wherein the first power transmission copper bar, the first inlet port and the plurality of groups of first connection ports are arranged on the first PCB board; the first inlet port and each group of first connection ports are further electrically connected to each other via the first power transmission copper bar; the first inlet port of each first distributor is connected to the distribution box via a first power line, and each electric equipment is respectively connected to the first inlet port of one of plurality of the first distributors via a second power line:
the first power transmission copper bar includes a live line copper bar and a neutral line copper bar; the live line copper bar and the neutral line copper bar are formed by copper foils printed on the first PCB board, and the copper foils each have a thickness of 50-100 µm; a fuse is arranged on the live line copper bar.

3. The heavy-current system used in a building according to claim 2, wherein each electric equipment includes a lighting device and a switch; wherein each group of first connection ports includes one lighting device port and at least one switch port; the lighting device port and the at least one switch port of the first connection port in a same group are connected in series between the live line copper bar and the neutral line copper bar.

4. The heavy-current system used in a building according to claim 2, wherein the first PCB board of each first distributor includes a first outlet port; the first inlet port of at least one of the plurality first distributors is connected to the first outlet ports of the other of the plurality of first distributors, thereby connecting to the distribution box via the other of the plurality of first distributors.

5. The heavy-current system used in a building according to claim 2, wherein each first distributor is installed in a cavity of a suspended ceiling, a partition, or a cabinet; the second power line led out from the first distributor goes through the cavity of the suspended ceiling, the partition, and/or the cabinet and electronically connects to a corresponding electric equipment.

6. The heavy-current system used in a building according to claim 3, wherein the lighting device port and the at least one switch port each has a quick-connect terminal arranged thereon; an end of the second power line connected to the lighting device and the corresponding switch is electrically connected to the lighting device port and the at least one switch port of the first PCB board via the quick-connect terminal; the quick-connect terminal includes a three-point conducting strip and a wire removing handle; when the wire removing handle is pressed down, the three-point conducting strip is loosened; when the wire removing handle is released, the three-point conducting strip clamps the second power line.

7. The heavy-current system used in a building according to claim 6, wherein the quick-connect terminals of the first connection ports in the same group are in a same color and/or have a same number, the quick-connect terminals of the first connection ports in different groups are in different colors; the end of the second power line connected to each electric equipment has a rubber cover in a same color and/or having a same number with the quick-connect terminal to which the second power line is connected.

8. The heavy-current system used in a building according to claim 2, wherein an alarm circuit and a buzzer are arranged on the first PCB board; the alarm circuit outputs an alarm signal to the buzzer when at least one of the plurality of first distributors is in an abnormal working state.

9. The heavy-current system used in a building according to claim 2, wherein the power transmission system further includes a plurality of second distributors installed in different positions, and a plurality of sockets; each second distributor includes a second PCB board, a second power transmission copper bar, a second inlet port, a second outlet port and a plurality of second connection ports; wherein the second power transmission copper bar, the second inlet port, the second outlet port and the plurality of second connection ports are arranged on the second PCB board; the second inlet port, the second outlet port and each second connection port are further electrically connected to each other via the second power transmission copper bar; the second inlet port of one of the plurality of second distributors is connected to the distribution box or to the second outlet port of a further second distributor via a third power line; each socket is connected to the plurality of second connection ports of each second distributor via a fourth power line.

\* \* \* \* \*